United States Patent [19]
Lust et al.

[11] Patent Number: 5,681,138
[45] Date of Patent: Oct. 28, 1997

[54] APPARATUS FOR REMOVING AND TRANSPORTING ARTICLES FROM MOLDS

[75] Inventors: Victor Lust, Orange Park; Stephen Robert Beaton, Neptune Beach; Henri Armand Dagobert, Jacksonville; Phillip King Parnell, Sr., Jacksonville; Craig William Walker, Jacksonville; Daniel Tsu-Fang Wang, Jacksonville, all of Fla.

[73] Assignee: Johnson & Johnson Vision Products, Inc., Jacksonville, Fla.

[21] Appl. No.: 757,154

[22] Filed: Nov. 27, 1996

Related U.S. Application Data

[63] Continuation of Ser. No. 258,267, Jun. 10, 1994, abandoned.

[51] Int. Cl.$^6$ ................................................. B65G 47/74
[52] U.S. Cl. ........................... 414/225; 414/752; 198/409; 198/432; 198/468.4; 198/468.9
[58] Field of Search ....................... 414/225, 729, 414/749, 752, 744.5, 793, 797, 737; 901/7; 198/409, 432, 468.4, 468.9; 425/337, 338, 444

[56] References Cited

U.S. PATENT DOCUMENTS

| | | | |
|---|---|---|---|
| 3,665,148 | 5/1972 | Yasenchak et al. | 901/7 X |
| 4,495,313 | 1/1985 | Larsen. | |
| 4,565,348 | 1/1986 | Larsen. | |
| 4,566,726 | 1/1986 | Correnti et al. | 414/752 X |
| 4,576,560 | 3/1986 | Herman | 414/225 X |
| 4,640,489 | 2/1987 | Larsen. | |
| 4,680,336 | 7/1987 | Larsen et al.. | |
| 4,691,820 | 9/1987 | Martinez. | |
| 4,768,919 | 9/1988 | Borgman et al. | 414/752 |
| 4,773,523 | 9/1988 | Hansen, Jr. et al. | 901/7 X |
| 4,810,154 | 3/1989 | Klemmer et al. | 901/7 X |
| 4,889,664 | 12/1989 | Kindt-Larson. | |
| 5,039,459 | 8/1991 | Kindt-Larson. | |
| 5,094,609 | 3/1992 | Kindt-Larson. | |
| 5,213,467 | 5/1993 | Harms | 414/749 X |
| 5,222,854 | 6/1993 | Blatt | 414/225 |

Primary Examiner—Donald W. Underwood

[57] ABSTRACT

Apparatus for removing and transporting ophthalmic lens mold sections from a mold, and generally comprising first, second, and third assemblies. The first assembly removes the lens mold sections from the mold and transports the lens mold sections to a first location, the second assembly receives the lens mold sections from the first assembly and transports the lens mold sections to a second location, and the third assembly receives the lens mold sections from the second assembly and transports the lens mold sections to a third location. Preferably, the first assembly includes a hand to receive the lens mold sections from the mold and to releasably hold the lens mold sections, and a support subassembly connected to the hand to support the hand and to move the hand between the mold and the first location. The second assembly preferably includes a support frame, a platform to receive the lens mold sections from the first assembly and supported by the support frame for movement between the first and second locations, and moving means for moving the platform along the support frame and between these first and second locations. The preferred design of the third assembly includes a transport subassembly and a support column. The transport subassembly receives the lens mold sections from the second assembly, releasably holds those lens mold sections, and carries the lens mold sections to the third location; and the support column supports the transport subassembly for movement between the second and third locations.

25 Claims, 7 Drawing Sheets

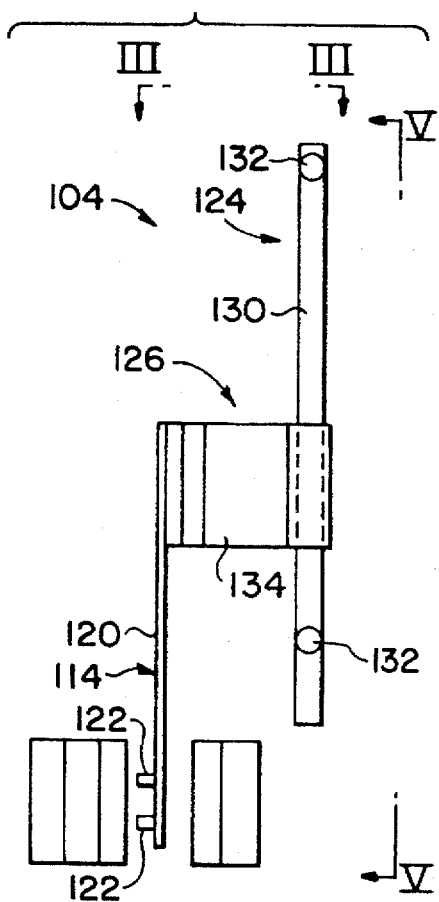
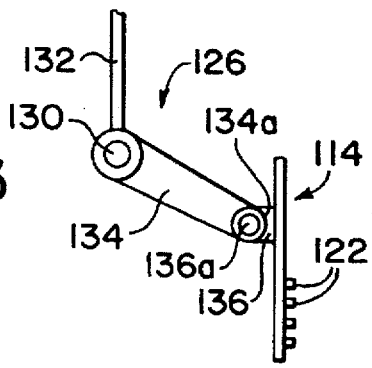
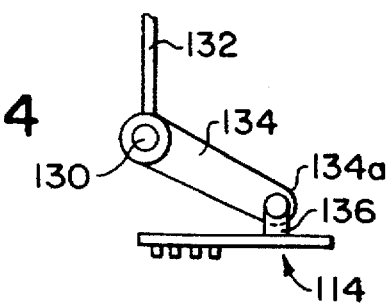
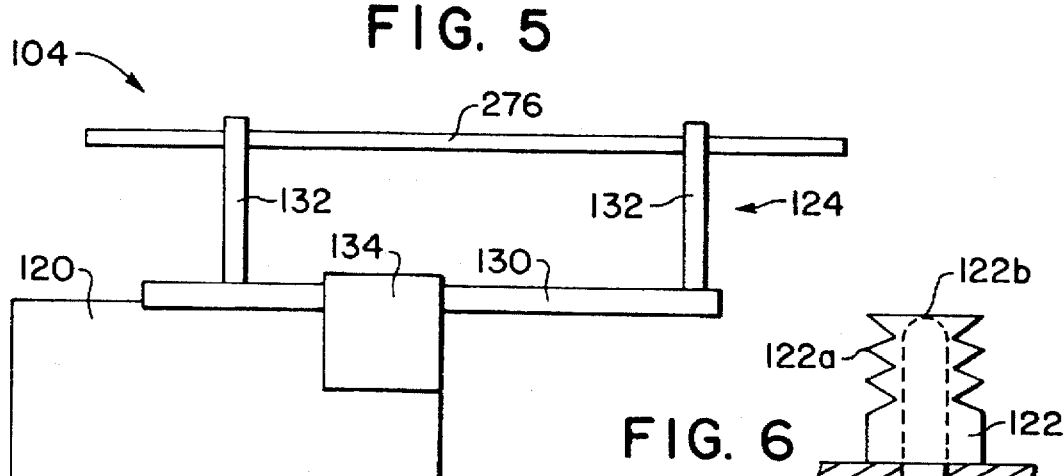
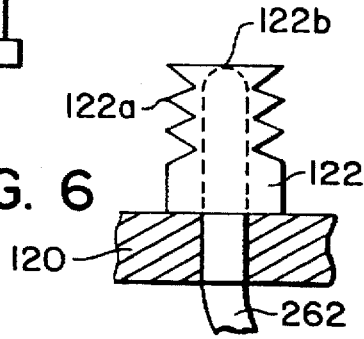

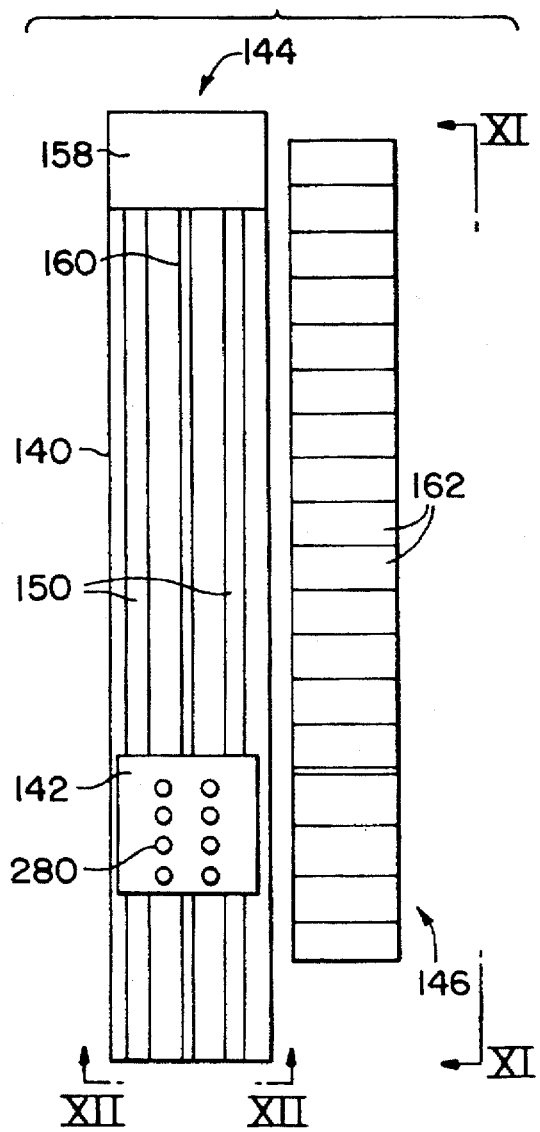
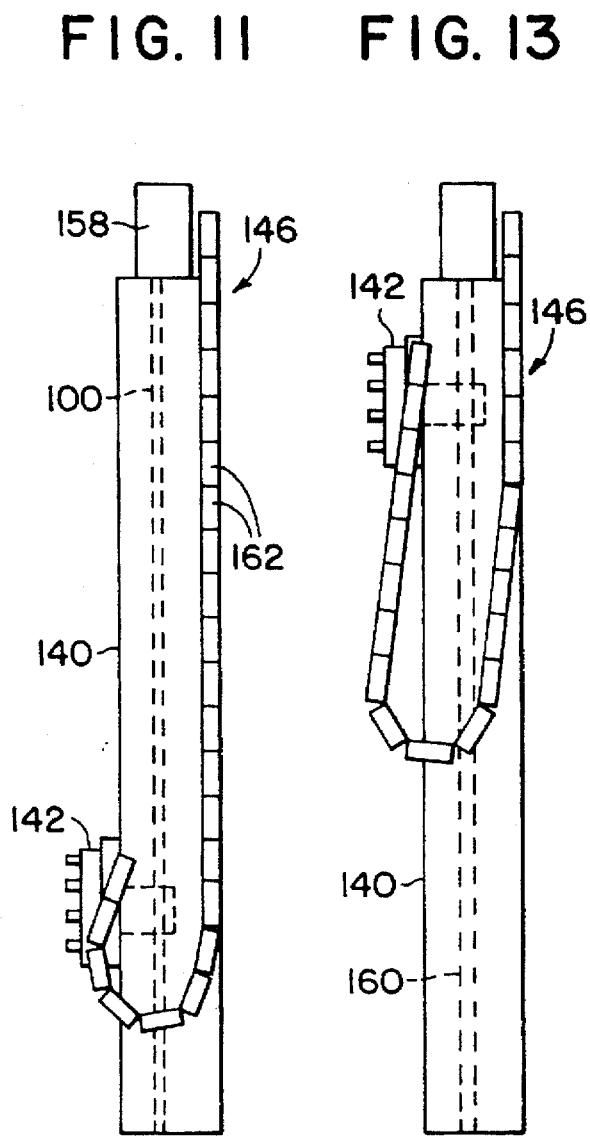
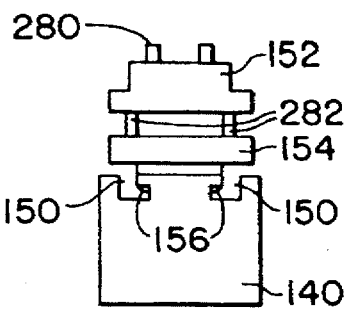

APPARATUS FOR REMOVING AND TRANSPORTING ARTICLES FROM MOLDS

This is a continuation of application Ser. No. 08/258,267, filed Jun. 10, 1994 and now abandoned.

BACKGROUND OF THE INVENTION

This invention generally relates to apparatus for removing and transporting articles from molds. More specifically, the present invention relates to such apparatus that is very well suited for carrying the articles, in a very short period of time, away from the molds and depositing the articles through a high speed, automated production system.

Recently, attention has been directed toward forming contact lenses in an automated molding system. In such a system, each lens is formed by sandwiching a monomer between front and back mold sections. The monomer polymerizes, forming a lens, which is then removed from the mold sections, further treated and then packaged for consumer use.

The mold sections used in the above-outlined process may themselves be formed in injection molding or compression molding processes. These mold sections may be made from the family of thermoplastics, and for example, polystyrene is an excellent material for making these mold sections. Polystyrene does not chemically react with the hydrophilic material used to make the contact lens, and very high quality contact lenses may be formed in polystyrene molds. In addition, polystyrene is widely available and relatively inexpensive. Because of the ease and low cost with which polystyrene mold sections may be made and then used to mold contact lenses, each pair of polystyrene mold sections typically is used to mold only one contact lens and is then disposed of.

In the above-discussed automated contact lens production system, it is desirable to eliminate or to minimize any exposure of the hydrophilic monomer to oxygen. Because of this, it is desirable to eliminate or minimize the exposure of the lens mold sections to oxygen. Thus, when polystyrene mold sections are made and then used in the above-discussed manner, it is desirable to transfer these mold sections quickly from the mold in which they are made, to a low oxygen (preferably nitrogen) environment. It is difficult to achieve the desired transfer speed with conventional robot assemblies or controls because presently available robots do not move fast enough and precise enough to get in and out of the mold with the desired speed. In particular, if these robots are moved with the desired speed, they tend to waffle and shake slightly as they come to a sudden stop, and the movements of the robot are not sufficiently precise. If the robots are slowed down to move more precisely, the robots no longer have the desired speed.

Also, in the above-mentioned automated contact lens production system, the contact lens mold sections may not be fully solidified when they are ejected from the mold in which they are made. It is hence important that any robot or apparatus that is used to carry the lens mold sections away from that mold not interfere with the desired solidification of the contact lens mold sections. In particular, it is important that any such robot or apparatus absorb the energy of the lens mold sections as they are transferred to that robot or apparatus without altering the shape, form or dimensions of the lens mold sections. That robot or apparatus must, likewise, be able to carry the lens mold sections in a manner that permits those lens mold sections to solidify in the desired manner.

In addition, in order to maximize the optical quality of the contact lenses, it is preferred that the optical surfaces of the polystyrene mold sections—that is, the surfaces of those mold sections that touch or lie against the hydrophilic monomer as the lens preform is being molded—not be engaged or touched by any mechanical handling equipment, as the mold sections are transported and positioned in the lens molding system.

SUMMARY OF THE INVENTION

An object of this invention is to improve apparatus for removing articles from molds.

Another object of this invention is to remove articles, which may not be completely solidified, from a mold and to carry those articles away from that mold without causing undue plastic deformations of the articles.

Another object of the present invention is to provide a high speed apparatus for removing fragile articles from a mold in which those articles are made, and then transporting those articles to and depositing those articles in a high speed, automated manufacturing system.

A further object of this invention is to transport articles made from the family of thermoplastics, such as polystyrene, from a mold in which those articles are made, and into a low oxygen environment of an automated contact lens molding system, in less than 12 seconds.

Another object of the present invention is to remove a plurality of discrete molded articles from a mold with the molded articles arranged in a matrix array, and to preserve that matrix array during subsequent handling of the molded articles.

These and other objectives are attained with an apparatus for removing and transporting articles from a mold, and generally comprising first, second, and third robots or material handling assemblies. The first assembly removes the articles from the mold and transports the articles to a first location, the second assembly receives the articles from the first assembly and transports the articles to a second location, and the third assembly receives the articles from the second assembly and transports the articles to a third location. These first, second and third locations may be selected from an infinite set of specific locations; and these first, second and third locations may change from time to time and from application to application.

Preferably, the first material handling assembly includes a hand to receive the articles from the mold and to hold the articles, and a support subassembly connected to the hand to support the hand and to move the hand between the mold and the first location. The support subassembly includes a support frame and a pair of arms that support the hand, first, for sliding movement along the support frame, and second, for pivotal movement between a substantially vertical orientation and a substantially horizontal orientation. Preferably, the hand of this first assembly is compliant, or is otherwise capable of dampening the energy of the articles, so that the hand does not cause any undesirable plastic deformation of the articles, even if those articles are not completely solidified when they are transferred to the hand.

The second material handling assembly preferably includes a support frame, a platform to receive the articles from the first assembly and supported by the support frame for movement between the first and second locations, and moving means for moving the platform between these first and second locations. Preferably, the platform includes a lower section mounted on the support frame, an upper section mounted on the support frame and including a receptacle to receive and to carry the articles, and means for reciprocating the upper section upward and downward relative to the lower section. Also, preferably, the support frame includes a top portion forming first and second channels extending along the support frame; and the platform further includes first and second legs extending into the first and second channels, respectively, to guide movement of the platform along the support frame.

The preferred design of the third material handling assembly includes a transport subassembly and a support column. The transport subassembly receives the articles from the second material handling assembly, releasably holds those articles, and carries the articles to the third location, and the support column supports the transport subassembly for movement between the second and third locations. The transport subassembly preferably includes first, second, and third arms, and a hand. The hand receives and releasably holds the articles; and the first, second, and third arms are connected together and to the hand to move the hand along a predetermined path.

In one embodiment of the invention, the third material handling assembly deposits the articles in the location to which the apparatus of the invention is used to carry the articles. In an alternate embodiment, the apparatus of this invention includes a fourth material handling assembly that receives the articles from the third assembly and carries the articles to a fourth location. Preferably, this fourth assembly, when used, inverts the articles and deposits the articles in pallets moving beneath the fourth assembly. The preferred embodiment of the fourth assembly includes a hand to receive and releasably hold the articles, an arm connected to the hand, and a support subassembly connected to the arm and supporting the arm for pivotal and reciprocating movement.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 2 is a top view of a first assembly of the apparatus shown in FIG. 1.

FIG. 3 is an end view of a portion of the assembly shown in FIG. 2, taken along line III—III thereof.

FIG. 4 is similar to FIG. 3, but shows a hand of the assembly in a horizontal position.

FIG. 5 is a side view of the assembly of FIG. 2, taken along line V—V thereof.

FIG. 6 illustrates a bellows of the hand of the assembly of FIG. 2.

FIG. 10 is a top view of a second assembly of the apparatus illustrated in FIG. 1.

FIG. 11 is a side view of the assembly shown in FIG. 16, taken along line XI—XI thereof.

FIG. 12 is an end view of the assembly of FIG. 10 and taken along line XII—XII thereof.

FIG. 13 is another side view of the assembly of FIG. 10 and showing a wire guideway of that assembly in a retracted position.

DETAILED DESCRIPTION OF THE PREFERRED EMBODIMENTS

Figure 1:
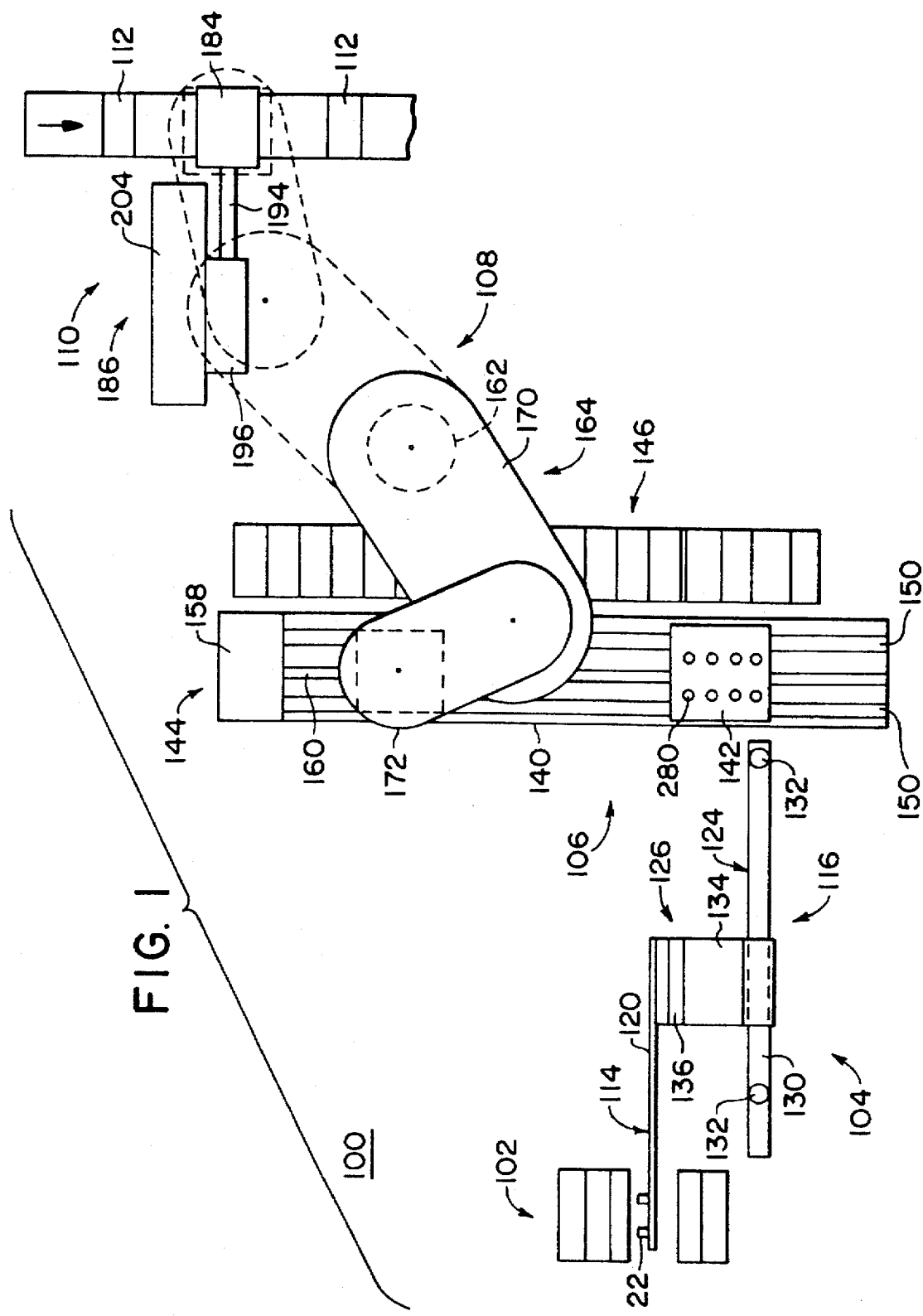
FIG. 1 is a simplified plan view of an apparatus according to the present invention.

FIG. 1 illustrates apparatus 100 for removing articles from mold 102 and transporting those articles to a predetermined location. Generally, apparatus 100 comprises first, second, and third material handling assemblies 104, 106, and 108, and the specific embodiment of apparatus 100 disclosed in FIG. 1 also comprises fourth or inverting assembly 110.

Generally, first assembly 104 is provided for removing articles from mold 102 and transporting the articles to a first location, assembly 106 is provided for receiving the articles from assembly 104 and transporting the articles from the first location to a second location, and assembly 108 is provided for receiving the articles from assembly 106 and transporting those articles from the second location to a third location. That third location may be a predetermined location to which apparatus 100 is used to transport the articles. However, with the embodiment of apparatus 100 shown in FIG. 1, fourth assembly 110 is provided to receive the articles from assembly 108 and to transport the articles to a fourth location, which preferably is the final location to which apparatus 100 is used to transport the articles.

Apparatus 100 is very well suited for transporting contact lens mold sections from mold 102, in which those mold sections are made, and depositing the mold sections in pallets 112 that are moved past apparatus 100. In this particular application, apparatus 100 may be used to transport two types of contact lens mold sections, referred to as the front curve and the back curve. As discussed in greater detail below, when apparatus 100 is used to carry the back curves, those mold sections are deposited in pallets 112 by third assembly 108, and fourth assembly 110 is not needed. When apparatus 100 is used to carry the front curves, fourth assembly 110 is used to receive these lens mold sections from assembly 108, to invert those mold section, and then to deposit the lens mold sections in pallets 112.

With reference to FIGS. 1 and 2–6, first assembly 104 includes hand 114 and support subassembly 116. Hand 114 includes base 120 and bellows 122, and support subassembly 116 includes support frame 124 and connecting means 126. Preferably, support frame 124 includes lower member 130 and posts 132, and connecting means 126 includes first arm 134 and second arm 136. With particular reference to FIGS. 1 and 10–13, second assembly 106 includes support frame 140, platform 142, moving means 144 and wire guideway 146. Support frame 140 includes a top portion forming channels 150; and platform 142 includes upper section 152, lower section 154, and legs 156. Moving means 144 includes motor 158 and ball screw 160, and wire guideway 146 includes a multitude of guideway sections 162.

Figure 17:
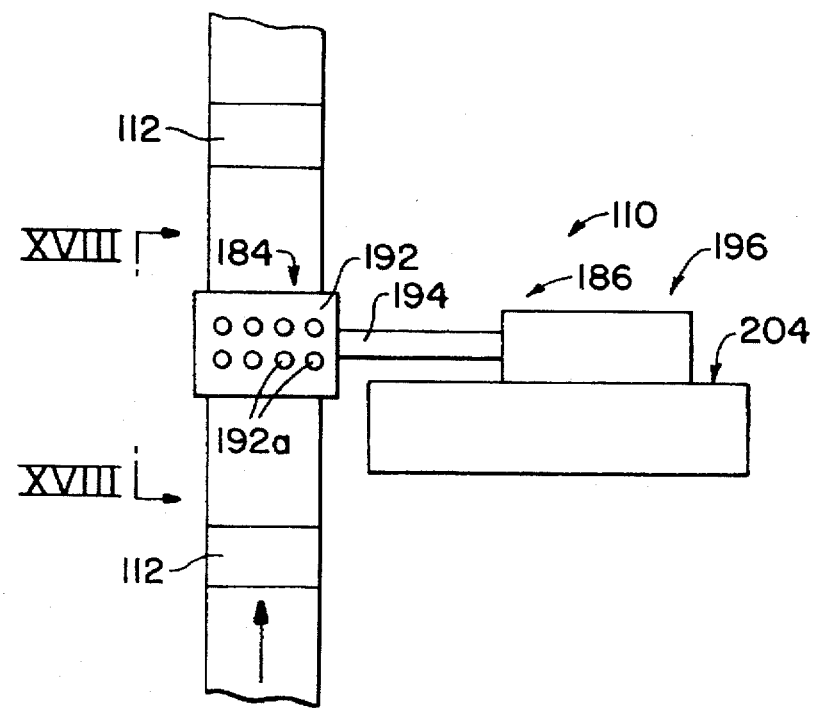
FIG. 17 is a top view of a fourth assembly of the apparatus of FIG. 1.
Figure 18:
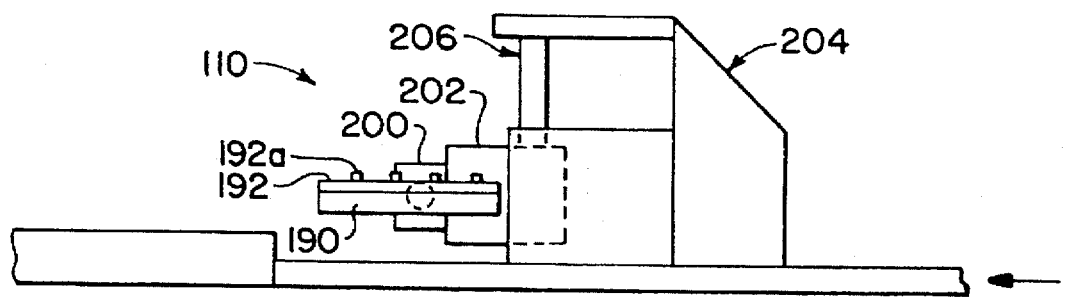
FIG. 18 is an end view of the fourth assembly, taken along line XVIII—XVIII of FIG. 17.

With particular reference to FIGS. 1 and 14–16, third assembly 108 includes transport subassembly 164 and support column or pedestal 166; and transport subassembly 164 includes first, second, and third arms 170, 172 and 174 and hand 176. Hand 176, in turn, includes base 180 and a suction plate 182. With reference to FIGS. 1, 17, and 18, fourth assembly 110 includes hand 184 and support subassembly 186; and hand 184 includes base 190 and suction plate 192, and subassembly 186 includes arm 194 and arm support means 196. Support means 196 includes first and second support members 200 and 202, support frame 204 and reciprocating means 206.

Figure 21:
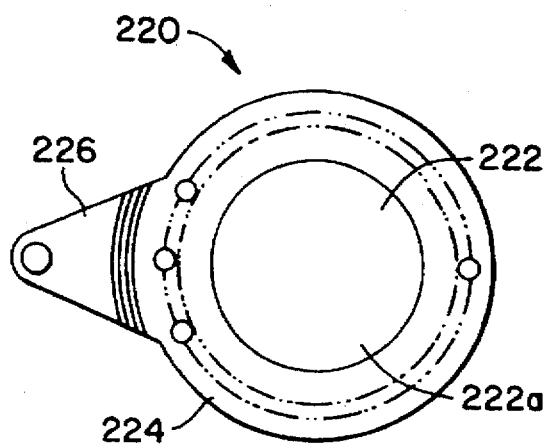
FIGS. 21 and 22 are top and side views, respectively, of an article that may be moved by the apparatus shown in FIGS. 1–18.
Figure 22:
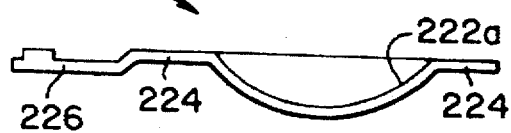

Apparatus 100 may be used in many different types of specific applications and with many different types of specific articles. For example, apparatus 100 may be used to transport articles of the types shown in FIGS. 21–24 and that are themselves used as mold sections to mold contact lenses. FIGS. 21 and 22 show mold section 220, referred to as the front curve, that is used as the bottom section of a mold in which a contact lens is made. Generally, mold section 220 includes central curved portion 222, annular flange portion 224, and tab 226. Surface 222a of central portion 222 is used to form or shape the front curve or surface of a contact lens, and flange portion 224 and tab 226 are used to facilitate handling and positioning mold section 220 and for optimization of the injection molding process.

Figure 23:
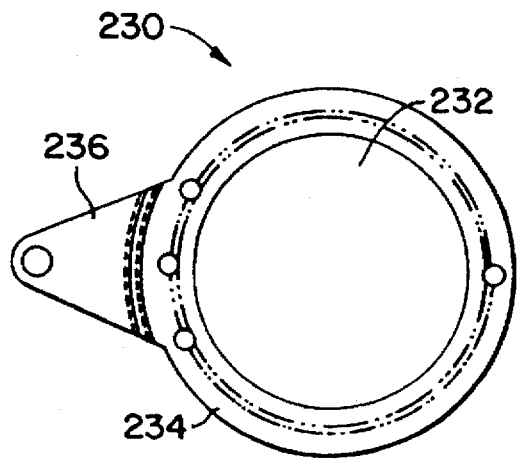
FIGS. 23 and 24 are top and side views, respectively, of another article that may be moved by the apparatus of FIGS. 1–18.
Figure 24:
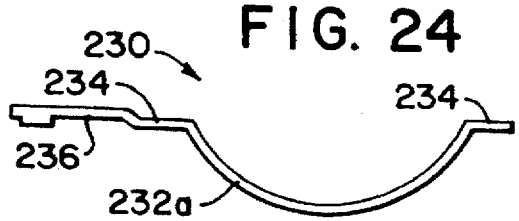

FIGS. 23 and 24 show mold section 230, referred to as the back curve, that is used as the top section of a mold in which the contact lens is made; and generally, mold section 230 includes central curved portion 232, annular flange portion 234 and tab 236. Surface 232a of central portion 232 is used to form or shape the back curve or surface of a contact lens, and flange portion 234 and tab portion 236 are used to facilitate handling and positioning mold section 230 and for optimization of the injection molding process.

Preferably, mold sections 220 and 230 are each integrally molded from a plastic material from the family of thermoplastics such as polystyrene or another suitable material; and preferably each mold section 220, 230 has a thickness, typically 0.8 mm and 0.6 mm respectively, and rigidity such that the mold section effectively transmits light and withstands prying forces applied to separate the mold sections from the mold in which those section were made. Mold sections 220 and 230 are described in detail in copending application number for "Mold Halves and Molding Assembly for Making Contact Lenses" (attorney Docket VTN-079), which is incorporated herein by reference.

Figure 25:
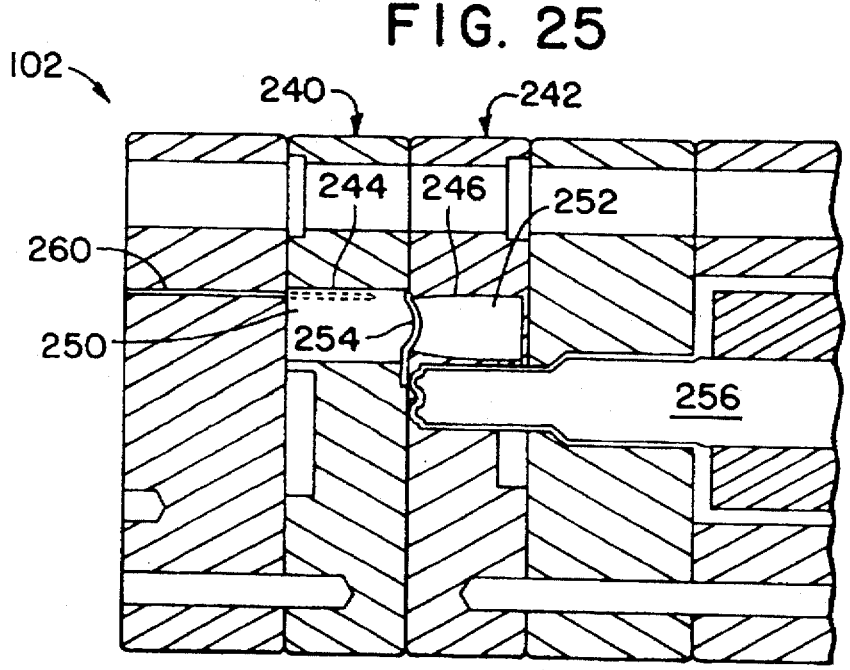
FIG. 25 is a simplified view of a mold with which the present invention may be used.

FIG. 25 is a simplified illustration of mold 102 in which mold sections 220 and 230 may be made. Generally, mold includes separable sections 240, 242 that form a multitude of pairs of aligned recesses. The pairs of these recesses are substantially identical, and for the sake of simplicity only one pair of recesses, referenced at 244 and 246, are shown in FIG. 25 and described herein. Molding inserts 250, 252 are disposed in recesses 244, 246, respectively, such that when mold sections 220 and 230 are brought together, inserts 250, 252 form a mold cavity 254 in which one of the lens mold sections 220 or 230 may be formed. At least one of the mold sections 240, 242 includes an extruder 256 to extrude a plastic material into cavity 254, and preferably one of the mold sections includes one or more ejector pins 260 to push the molded articles away from the mold section after that article is formed. By changing the specific type of molding inserts in mold sections 240 and 242, mold 102 may be used to form either mold section 220 or mold section 230. Mold 102 is also described in detail in the above-referenced copending application no. for "Mold Halves and Molding Assembly for Making Contact Lenses."

With reference again to FIGS. 1–6, hand 114 of assembly 104 is provided to receive articles from mold 102, after the mold is opened, and to releasably hold those articles. With the embodiment of hand 114 illustrated in FIGS. 1–6, bellows 122 are mounted and positioned on base 120 so that when hand 114 is located between the sections of mold 102, as shown in FIG. 1, each of the bellows 122 is aligned with a respective one of the mold cavities of mold 102 and, thus, with a respective one of the articles formed in those mold cavities. After mold 102 is opened and hand 114 is positioned between the mold sections, ejector pins 260 are used to push the formed articles out of the mold section and into engagement with bellows 122.

With particular reference to FIG. 6, each of the bellows 122 preferably has an axially extending sidewall 122a that forms an open outward end 122b on which the contact lens mold sections are placed. Furthermore, preferably, when a back curve 230 is transferred onto one of the bellows 122, the annular flange 234 of the back curve is pushed onto the outward, circumferentially extending edge of the side wall of the bellows. When a front curve 220 is transferred onto one of the bellows, the side of the front curve opposite surface 222a is pushed onto the outside edge of the side wall of the bellows. In this way, the surfaces of the article 220 or 230 that are actually used to form the contact lens are not touched by the bellows.

In addition, as represented in FIG. 6, preferably each of the bellows 122 is connected to a source of low pressure, via a suitable line 262, to help handle the articles 220 and 230. In particular, a low pressure may be developed inside bellows 122 to help move the articles 220 or 230 onto the bellows from mold cavity 254, and that low pressure may be maintained in the bellows to help hold the articles on the bellows as hand 114 is moved to carry the articles away from mold 102.

The low pressure source that is connected to bellows 122 may be, for example, a vacuum or a vacuum pump, or a source of pressure, referred to as a negative pressure, that is less than the ambient pressure. Also, preferably, each of the bellows 122 of hand 114 are connected to a common manifold via a respective line or hose 262, and that manifold is connected to the low pressure source via a suction line. A solenoid controlled valve may be located in that suction line to connect the bellows 122 selectively to the low pressure source.

In addition, the sidewalls 122a of bellows 122 are preferably compressible so that the sidewalls dampen and absorb the energy and momentum of the contact lens mold sections as those mold sections are transferred from mold 102 to the bellows 122. In this way, those contact lens mold sections can be transferred from mold 102 to the bellows 122 at a relatively high speed without damaging or deforming the contact lens mold sections, even if those mold sections are not completely solidified when they are transferred to the bellows.

Figure 7:
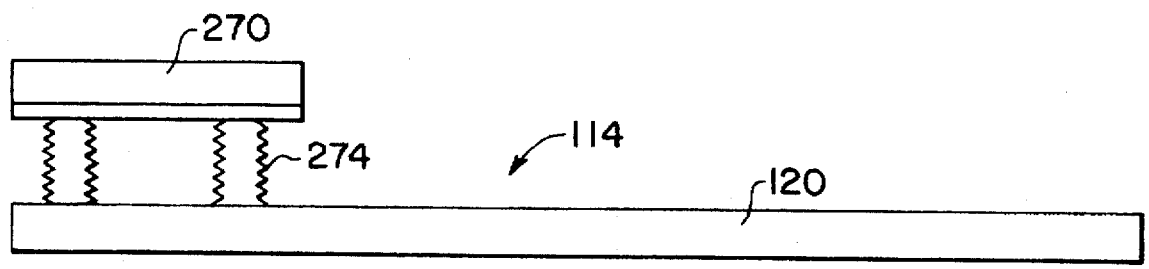
FIG. 7 shows an alternate embodiment of the hand of the assembly of FIG. 2.
Figure 8:
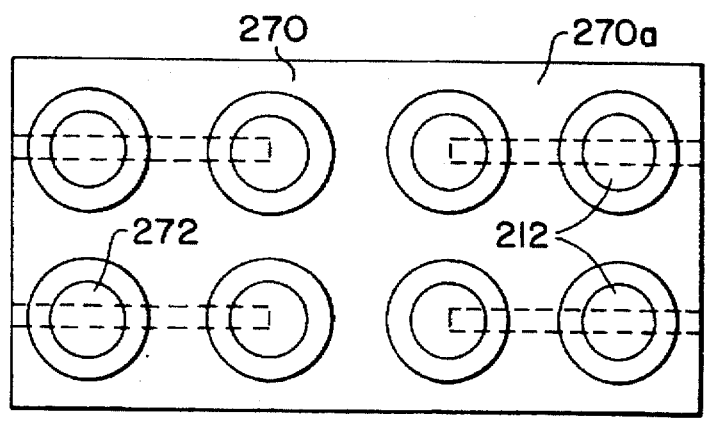
FIG. 8 is a top view of a receiving plate of the hand of FIG. 7.
Figure 9:
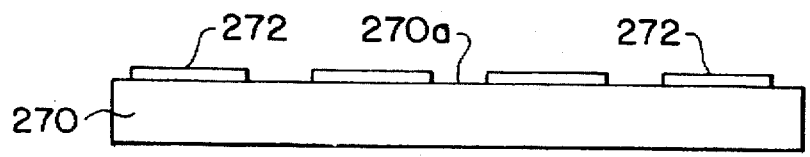
FIG. 9 is a side view of the receiving plate shown in FIG. 8.

FIG. 7 illustrates an alternate embodiment of hand 114, in which a plate 270 is substituted for bellows 122. More specifically, with reference to FIGS. 7–9 plate 270 forms or includes a multitude of receptacles 272 for receiving contact lens mold sections 220 and 230 from mold 102. Also, plate 270 is connected to base member 120 by a plurality of bellows or springs 274, allowing plate 270 to absorb the energy and momentum of the contact lens mold sections as those mold sections are transferred to plate 270.

Receptacles 272 may comprise small wells or recesses formed in a surface 270a of plate 270, or these receptacles may comprise small cups mounted on that surface of the plate. In addition, the receptacles are preferably connected to a source of low or negative pressure, in order to produce a low or negative pressure in the receptacles, in a manner similar to the way in which bellows 122 may be connected to a low pressure source.

With reference to FIGS. 1–5, support subassembly 116 of assembly 104 is connected to hand 114 to support the hand and to move the hand between mold 102 and the first location, which preferably is directly above platform 142 of second assembly 106. Preferably, support frame 124 is located adjacent mold 102, and connecting means 126 is supported on frame 124 for sliding movement toward and away from mold 102. At the same time, connecting means 126 is connected to hand 114 so that as the connecting means slides along frame 124, hand 114 moves with the connecting means toward and away from mold 102.

More specifically, arm 134 of connecting means 126 is slidably mounted on frame 124, specifically member 130 thereof, and arm 134 extends outward from this frame. Arm 136 is pivotally mounted on an outward end of arm 134 and extends outward therefrom, and hand 114 is rigidly connected to an outward end of arm 136 for movement therewith. With this arrangement, arms 134 and 136 carry hand 114 toward and away from mold 102, while allowing the hand to pivot between a substantially vertical orientation, as shown in FIG. 3, and a substantially horizontal orientation, as shown in FIG. 4.

With the embodiment of subassembly 116 shown in FIGS. 2–5, support frame 124 includes longitudinally extending bar 130 and arm 134 forms a sleeve portion 134a that is mounted on bar 130 for sliding movement therealong. In addition, arm 136 includes a sleeve portion 136a that is pivotally mounted on an outward end of arm 134 for at least limited swinging movement about an axis thereof, between the position shown in FIGS. 3 and 4. Any suitable means, schematically represented at 302 and 304, may be utilized to move arms 134 and 136 along frame 124, and to pivot arm 136 and hand 114 between the positions shown in FIGS. 3 and 4.

Moreover, preferably, support frame 124 itself is supported for movement toward and away from mold 102. In particular, posts 132 of frame 124 are connected to and extend upward from bar 130, and the top ends of these posts are mounted on member 276 for sliding movement therealong. With this arrangement, support frame 124 slides along member 276 and, at the same time, hand 114 and arms 134 and 136 slide along the support frame. Member 276 itself may be supported in any suitable manner, and any suitable means, schematically represented at 306, may be used to move frame 124 along member 276.

Any suitable materials may be used to make the elements or components of assembly 104, and any suitable means may be used to move those components in the above-described manner. Preferably, assembly 104 is a high speed, low mass assembly, and is able to move hand 114 into mold 102 and remove articles therefrom in less than 0.8 seconds, and more preferably, in less than 0.4 seconds. Also, preferably base 120 of hand is constructed from a low mass, high stiffness material; and, for instance, base 120 may be made from a polyvinylchloride foam core, carbon fiber unidirectional fabric.

As previously mentioned, second material handling assembly 106 receives articles from first material handling assembly 104 at the first location and transports those articles to the second location. Generally, assembly 106 includes support frame 140, platform 142 and moving means 144, and preferably second assembly 106 further includes wire guideway or conduit 146. With reference to FIGS. 10–13, support frame 140 has the general shape of an elongated cube or box and extends from a position located directly below the above-mentioned first location to a position directly below the above-mentioned second location. The top portion of frame 140 forms channels 150 that longitudinally extend between the transverse ends of the support frame.

Platform 142 is provided to receive articles from first assembly 104, specifically hand 114 thereof, and to carry those articles, and the platform includes upper and lower sections 152 and 154 and legs 156. Lower section 154 of platform 142 is mounted on support frame 140 for sliding or rolling movement therealong, and legs 156 are connected to lower section 154 and extend downward therefrom and into channels 156. Legs 156, thus, guide section 154, and platform 142, as the platform moves along frame 140. Preferably, as shown in FIG. 12, each of the channels 150 has an L-shape, and each of legs 156 curves downwardly laterally inwardly, and extends to a position directly beneath an upper central member 140a of platform 140. In this way, legs 156 also help to hold platform 142 on frame 140 as the platform moves therealong.

Upper section 152 of platform 142 is mounted on lower section 154 and section 152 includes or forms a multitude of receptacles 280 for receiving and holding articles. Preferably, receptacles 280 on platform 142 are located so that when hand 114 of assembly 104 is positioned directly above platform 142, each of the bellows 122 of hand 114 is aligned with a respective one of the receptacles 280 of platform 142. Any suitable type of receptacles 280 may be provided on upper platform section 150 to hold the articles. For example, receptacles 280 may comprise small wells or recesses formed in the top surface of section 152, or alternatively, the receptacles may comprise small cups mounted on a top surface of section 152.

In addition, upper section 152 is supported on lower section 154 for upward and downward reciprocating movement thereon. In a lower position, upper section 152 rests directly on lower section 154; and in an upper position, shown in FIG. 12, upper section 152 is spaced slightly above lower section 154. Any suitable means, schematically represented at 310, may be used to move section 152 upwards and downwards on section 154 and to guide that upward and downward reciprocating movement of section 152. For example, a multitude of pins or rods 282 may be mounted on lower section 154 and extend upward into corresponding recesses or sockets in upper section 152; and, as section 152 moves upward and downward, these rods 282 guide that movement of the upper section, maintaining the desired alignment of the upper section on lower section 152.

In the operation of apparatus 100, to transfer articles from assembly 104 to assembly 106, hand 114 of assembly 104 is located directly above platform 142, with each of the bellows 122 of hand 114 aligned with a respective one of the receptacles 280 on platform 142. Upper section 152 of platform 142 is then raised to a position in which articles 220 or 230 on bellows 122—and in particular, the annular edges of those articles—are either touching or slightly above the surfaces forming receptacles 280. The pressure inside the bellows 122 is then increased to a level near, at or above ambient pressure, and the articles 220 or 230 then move downward onto receptacles 280. Platform section 152 is then lowered onto platform section 154, and platform 142 is then moved along guide frame 140 to a position adjacent the back end thereof.

Moving means 144 is provided to move platform 142 along frame 140, and preferably the moving means includes motor 158 and ball screw 160, which preferably is a threaded rod. Ball screw 160 longitudinally extends along support frame 140 and is supported by frame 140 for rotation about the axis of the rod. Also, ball screw 160 is connected to platform 142 so that rotation of the ball screw about its axis moves platform 142 forward or rearward along support frame 140, depending on the direction in which the ball screw rotates. Motor 158 is located adjacent support frame 140 and is connected to ball screw 160 to rotate that ball screw about its axis, either clockwise or counterclockwise. Preferably, motor 158 is supported by frame 140 and is connected to an end of ball screw 160.

As will be understood by those of ordinary skill in the art, other means may be used to hold and carry mold sections 220 and 230 along support frame 140. For example, pallets 112, or other carriers similar to those pallets, may be used to hold the mold sections as they are moved along assembly 106.

In the operation of assembly 106, it may be desirable to connect various wires, hoses or flexible lines to platform 142, and guideway 146 is located adjacent support frame 140 to guide any such wires or lines and to help insure that these wires or hoses do not become entangled with each other as platform 142 moves along the support frame. Guideway 146 is supported for movement between extended and retracted positions, and the guideway is connected to platform 142 so that as the platform moves between positions adjacent the longitudinal ends of frame 140, the guideway 146 moves between its retracted and extended positions.

More specifically, guideway 146 comprises a multitude of sections 162, and each of these sections has a generally flat rectangular shape. The sections 162 are arranged in sequence, one after another, extending between first and last sections; and in this sequence, each section 162 is pivotally connected to its neighboring section or sections. Sections 162 form an open loop; and in particular, with reference to FIGS. 11 and 13, guideway 146 extends forward from a first end, then upwards and then rearward to a second end. In the extended position, shown in FIG. 11, the second end of the guideway is substantially forward of the first end of the guideway; and in the retracted position, shown in FIG. 13, the second end of the guideway is slightly forward of the first end of the guideway.

Figure 14:
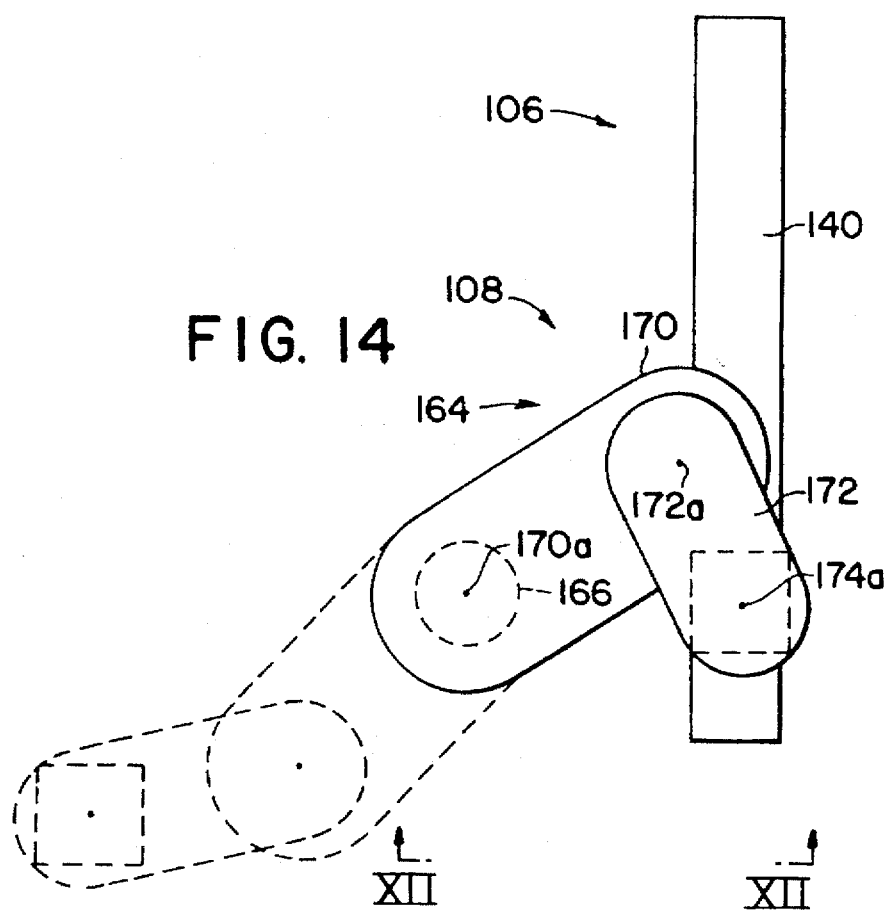
FIG. 14 is a simplified top view showing a third assembly of the apparatus of FIG. 1.
Figure 16:
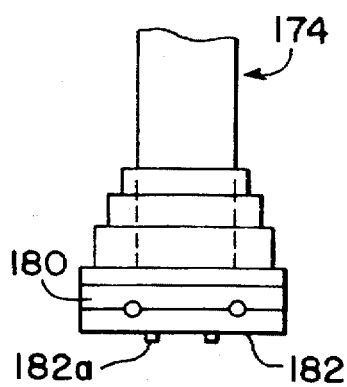
FIG. 16 shows a portion of the third assembly.
Figure 15:
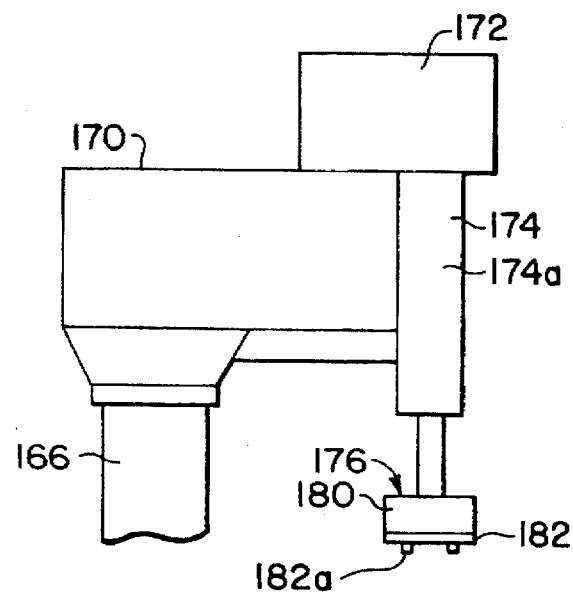
FIG. 15 is a side view of the third assembly, taken along line XII—XII of FIG. 14.

Third material handling assembly 108 is illustrated in detail in FIGS. 14–16. Generally, transport subassembly 164 is provided to receive articles from second material handling assembly 106, to releasably hold those articles and to carry the articles to a third location, and support column 166 supports subassembly 164 for movement between the second and third locations. More specifically, support column 166 is supported and extends upward between the above-mentioned second and third locations. First arm 170 of subassembly 164 is supported by support column 166 for pivotal movement, and this first arm extends outward from the support column; and second arm 172 is supported by first arm 170 for pivotal movement, and arm 172 extends outward from arm 170. Third arm 174 of subassembly 164 is connected to second arm 172 for movement therewith, and arm 174 extends downward from arm 172, and hand 176 is connected to arm 174 for movement therewith.

Preferably, arm 170 is supported by column 166 for pivotal movement about a first axis 170a, arm 172 is supported by arm 170 for pivotal movement about a second axis 172a, and arm 174 extends downward from arm 172 along a third axis 174a. Preferably, axes 170a, 172a, and 174a are parallel to and spaced from each other. With the preferred embodiment of assembly 110 shown in FIGS. 12–14, a first end of arm 170 is mounted directly onto support column 166, a first end of arm 172 is mounted directly on a second end of arm 170, and arm 174 extends downward from a second end of arm 172. Support column 166 and arms 170, 172, and 174 may be made of any suitable materials. Likewise, arm 170 may be pivotally connected to support column 166 and arms 170 and 172 may be pivotally connected together in any suitable manner. In addition, any suitable means, schematically represented at 312 and 314, such as electric motors, may be used to pivot arms 170 and 172 about axes 170a and 172a.

Preferably, third arm 174 is extensible, and this arm is extended and retracted to lower and raised hand 176, respectively. Any suitable means, schematically represented at 316, may be used to extend and to retract arm 174; and, for instance, a direct drive means may be mounted in arm 174 and connected to hand 176.

Hand 176 is provided for receiving and releasably holding articles 220 and 230, and preferably this hand includes base 180 and a suction plate 182. Base 180 is connected to a lower end of arm 176 for upward, downward, and lateral movement therewith, and suction plate 182 is connected to and extend downward from base 180. Suction plate 182 is similar or identical to suction plate 270 described above; and in particular, the suction plate includes a multitude of receptacles 182a for receiving and holding the contact lens mold sections. These receptacles 182a of plate 182 are positioned so that, when hand 176 is located directly above platform 142 of second assembly 106, each of the receptacles 182a is located directly above a respective one of the receptacles 280 of platform 142, allowing for a transfer of articles 220 and 230 from receptacles 280 to suction plate 182.

These articles 220 and 230 may be transferred from receptacles 280 to suction plate 182 in any suitable manner. For instance, suction plate 182 may be connected to a source of low pressure. To transfer articles 220 or 230 from receptacles 280 to hand 176, this hand is lowered so that the receptacles 182a of plate 182 are in engagement with or are immediately above the articles in receptacles 280; and a low pressure is developed inside suction plate 182, drawing the articles onto receptacles 182a thereof.

Receptacles 182a may be connected to the low pressure source in a manner similar to the way in which bellows 122 of assembly 104 may be connected to such a pressure source. In particular, each of the receptacles 182a of hand 176 may be connected to a common manifold by a respective one line or hose, and that manifold may be connected to the desired low pressure source by a suction line. A solenoid operated control valve may be located in that suction line so that receptacles 182a are operatively connected to the low pressure source, and the desired low pressure is developed inside these receptacles at the desired times.

If desired, ejector pins (not shown) may be mounted inside platform 142, below receptacles 280, to help move the articles upward onto suction plate 182. Further, positive pressure inside receptacles 280 may be used to help move the articles from platform 142 to suction plate 182. More specifically, each of receptacles 280 may be connected to a source of positive pressure—that is, a pressure above ambient pressure—to produce a positive pressure inside the receptacles that helps to push the articles in the receptacles upward and onto the suction plate 182. Receptacles 280 may be connected to this positive pressure source in the same way that suction plate 182 may be connected to a low pressure source. Each of the receptacles 280 may be connected to a common manifold by a respective one hose, and that manifold may be connected to the desired positive pressure source by a high pressure line. A control valve, operated by a solenoid, may be positioned in this high pressure line to develop the positive pressure inside receptacles 280 at the preferred times.

In the operation of assembly 108, arm 170 is pivoted about axis 170a and arm 172 is pivoted about axis 172a, to the position shown in FIG. 14, where arm 174 and hand 176 are directly above platform 142. Hand 176 is then lowered toward or into engagement with platform 142, articles are transferred from platform 142 to hand 176, and the hand is then raised, clearing the hand from platform 142. Arm 170 is then pivoted about axis 170a, clockwise as viewed in FIG. 14, and, simultaneously, arm 172 is pivoted about axis 172a, counterclockwise as viewed in FIG. 14, until arm 174 is located directly above the position at which the articles are to be deposited. Arm 174 is then extended to lower hand 176, and articles may be transferred from hand 174 either to hand 184 of assembly 110 or to pallets 112.

Whether assembly 108 transfers the articles to assembly 110 or to pallets 112 depends on whether assembly 108 is carrying a front curve or a back curve—that is, a mold section 220 or a mold section 230. To elaborate, when apparatus 100 carries these mold sections 220 and 230, preferably all physical contact between the elements of apparatus 100 and the mold sections is not in proximity of critical optical surfaces of those mold sections. For instance, all such physical contact between the elements of apparatus 100 and the mold sections 220 or 230 may be on the sides of the mold sections that are opposite the optical surfaces of those mold sections—that is, on the side of mold section 220 that is opposite surface 222a, and on the side of mold section 230 that is opposite surface 232a.

In this way, there is no direct physical contact between any part of apparatus 100 and the surfaces of the mold sections that directly engage the hydrophilic material used to form the contact lens molded between mold sections 220 and 230. Thus, when assembly 108 carries a front curve, mold section 220, away from assembly 106, the mold section is inverted from the position shown in FIG. 22, and surface 222a is on the bottom of the mold section; while when assembly 108 carries a back curve, mold section 230, away from assembly 106, the mold section is in the position shown in FIG. 24, and surface 232a is on the bottom of the mold section.

In addition, when mold sections 220 and 230 are deposited in pallets 112, it is preferred that optical surface 222a of mold section 220 face upwards and that optical surface 232a of mold section 230 face downward (in the orientations shown in FIGS. 22 and 24, respectively). Thus, when assembly 108 carries mold section 230 away from assembly 106, the mold section is in the proper orientation for transfer to pallet 112, and the mold section can be transferred directly from hand 176 to pallet 112. However, when assembly 108 carries mold section 220 away from assembly 106, the mold section is not in the proper orientation for transfer to pallet 112, and the mold section must be inverted in order to orient it properly for transfer to pallet 112. The preferred embodiment of fourth material handling assembly 110 is provided to do this.

As mentioned above, fourth assembly 110 includes hand 184 and support subassembly 186. Preferably, hand 184 includes base 190 and suction plate 192; and subassembly 186 includes arm 194, arm support members 200 and 202, frame 204, and reciprocating means 206. Hand 184 is provided to receive articles from third assembly 108, specifically hand 176 thereof, and to hold those articles while they are transported to a further location. In particular, base 190 has a generally flat, planar shape, and suction plate 192 is mounted on the base and extends outward therefrom. Suction plate 192 is similar or identical to suction plate 270 described above, and in particular, plate 270 includes a multitude of receptacles 192a for receiving and holding the contact lens mold sections. Also, receptacles 192 are positioned so that when hand 176 is located directly above hand 184, each of the receptacles 192a is aligned with a respective one of the receptacles 182a of hand 176.

To transfer articles from assembly 108 to assembly 110, hand 176 is located directly above hand 184, and then hand 176 is lowered so that suction plate 182 is closely adjacent suction plate 192. The pressure in suction plate 182 is increased to a level near, at or above ambient pressure, and the articles move from suction plate 182 to suction plate 192. Preferably, plate 192 is connected to a source of low pressure, and the pressure inside receptacles 192a may be decreased to help move and hold the articles thereon. Preferably, the annular flanges of articles 220 or 230 seat on the edges of receptacles 192a, so that central portions of the articles 220 and 230 are not contacted by any mechanical handling equipment.

Suction plate 182 may also be connected to a high or positive pressure source, in a manner similar to the way in which this suction plate may be connected to a low or negative pressure sources, in order to develop an above ambient pressure in plate 182. In addition, plate 192 may be connected to a low or negative pressure source in the same manner in which plate 182 may be connected to such a pressure source, and a solenoid operated control valve may be used to produce a low pressure in receptacles 192a at the preferred times.

Support subassembly 186 is provided to move hand 184 of assembly 110 between third and fourth locations, and the preferred embodiment of subassembly 186 is used to pivot and to reciprocate hand 184. With the embodiment of subassembly 186 illustrated in the drawings, a first end of arm 194 is pivotally mounted on support member 200, arm 194 extends outward from that support member, and hand 184 is rigidly connected to an outward or second end of arm 194 for pivotal movement therewith. Any suitable means, schematically represented at 320, may be located on or in member 200 and connected to arm 194 to pivot the arm and, thus, hand 184 about the axis of the arm 194. Preferably, hand 184 is pivoted substantially 180°, from a position in which the receptacles 192a face or extend directly upward to a position in which these receptacles face or extend directly downward. For example, hand 184 and rod 194 may be pivoted by rotary actuator (air cylinder style) 196.

In addition, support member 200 is rigidly connected to support member 202, this latter member 202 is supported by frame 204 for upward and downward reciprocating movement, and reciprocating means 206 is used to move member 202 upward and downward. With the above-described arrangement, arm 194 and hand 184 move upward and downward as members 200 and 202 move upward and downward. Any suitable means, schematically represented at 322, may be used to reciprocate member 200 and 202. For instance, a pair of direct drive means or a pair of conventional pneumatic or hydraulic cylinders may be mounted on frame 204 and connected to member 202 to reciprocate that member and, thereby, member 200, arm 194, and hand 184.

Figure 19:
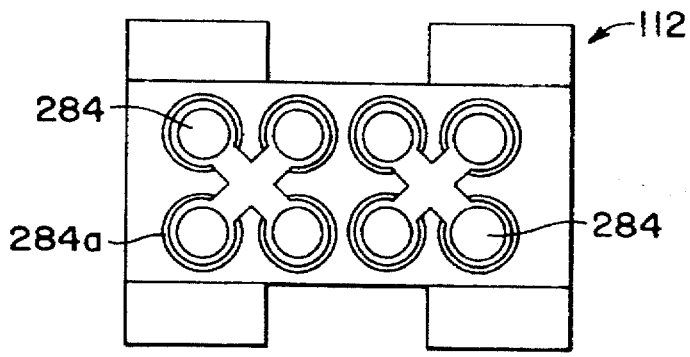
FIG. 19 is a top view of a pallet for receiving articles from the assembly shown in FIGS. 17 and 18.
Figure 20:
FIG. 20 is a cross-sectional view of a portion of the pallet.

As will be understood by those of ordinary skill in the art, hands 176 and 184 of assemblies 108 and 110 may each be provided with a set of bellows of the type shown at 122 in FIG. 6, in place of the suction plates 182 and 192 respectively. In such a case, in order to transfer articles 220 from assembly 106 to 108, those articles are transferred from receptacles 266 to the bellows of hand 176. Similarly, in order to transfer articles 220 or 230 from assembly 108 to assembly 110, those articles are transferred from hand 176 to the bellows of hand 184. Also, with reference to FIGS. 19 and 20, preferably the edges of receptacles 284 of pallet 112 tapers upwardly outwardly, as shown at 284a, to facilitate placement of the contact lens mold sections 220 and 230 in those receptacles. Further, as will be appreciated by those of ordinary skill in the art, other suitable means, such as pallets 112 or devices similar to these pallets, may be used to hold and move the mold sections through assemblies 106, 108, and 110.

With the above-described operation of apparatus 100, as each set of contact lens mold sections is moved from mold 102 to one of the pallets 112, the spatial relationships of the lens mold sections in the set are preserved. In particular, the lens mold sections in each set of lens mold sections form a matrix array that is preserved as the lens mold sections are moved through apparatus 100.

In addition, a spatial relationship may be preserved between the lens mold sections after they are placed in pallets 112 and even during subsequent handling or use of the lens mold sections, and a spatial relationship may be preserved between the contact lenses formed between each pair of line mold sections. Under these circumstances, the spatial position of the mold sections and even of the formed contact lenses indicate the mold cavity in which either the mold sections or the mold sections add to make the contact lenses were made. In this case, if flaws are detected in contact lenses, and operator can readily determine the mold cavity or cavities in which the lens mold sections, which were used to make the contact lenses, were themselves made.

Control means may be provided to move the various elements of apparatus 100 in the desired sequence, and to interrupt or terminate operation of the apparatus under predetermined conditions. For instance, one or more timers may be provided and programmed to generate signals to initiate movement of the movable components of assemblies 104, 106, 108 and 110. Timers may also be provided and programmed to operate solenoid activated valves that connect bellows 122, suction plate receptacles 280 to positive and negative pressure sources at the desired times. Position sensors may also be used to initiate movement of the movable elements of apparatus 100 and to operate the above-mentioned valves, in response to various elements of apparatus 100, such as hand 114, platform 142, and hands 180 and 190, reaching predetermined positions. If desired, position sensors may be used to sense whether the movable elements of apparatus 100, such as hand 114 and platform 142, are moving between the appropriate locations.

In addition, sensors may be provided to determine if each of the bellows 122 receives a respective one contact lens mold section from mold 102, and to determine whether these contact lens mold sections are properly transferred from assembly 104 to assemblies 106 and 108, and if appropriate to assembly 110. For example, such sensors may be located in and sense the pressures in the suction lines leading to the low pressure manifolds connected to bellows 122, receptacles 280 and suction plates 182 and 192.

To elaborate, when contact lens mold section are properly mounted on all of the bellows 122, for example, those lens mold section closes the outward ends of those bellows. If, at the same time, the bellows are connected to a low pressure source, the pressure inside the low pressure manifold leading to the bellows is reduced to a predetermined level. In contrast, if contact lens mold sections do not close the outward ends of all of the bellows 122 when those bellows are connected to the low pressure source, then the pressure inside the low pressure manifold leading to the bellows will not be reduced to that predetermined level. Thus, the pressure inside the low pressure manifold when the bellows 122 are connected to the low pressure source is an indication of whether contact lens mold sections are mounted on all of those bellows, and a pressure sensor may be employed to generate a signal or an alarm to indicate when a contact lens mold section is missing from one of the bellows.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. Apparatus for removing and transporting ophthalmic lens mold sections from a mold, comprising:

a first assembly for removing the lens mold sections from the mold and transporting the lens mold sections to a first location;

a second assembly for receiving the lens mold sections from the first assembly and transporting the lens mold sections to a second location; and a third assembly for receiving the lens mold sections from the second assembly and transporting the lens mold sections to a third location;

wherein the first assembly includes
      a hand to receive the lens mold sections from the mold and to releasably hold the lens mold sections, and
      a support subassembly including
         i) a support frame,
         ii) connecting means mounted on the support frame for linear sliding movement therealong, connected to the hand, and supporting the hand for linear sliding movement along the support frame and for pivotal movement between a substantially vertical position and a substantially horizontal position, and
         iii) means to slide the connecting means along the support frame to slide the hand into the mold to receive the lens mold sections therefrom, and then to slide the hand away from the mold and to pivot the hand from the vertical position to the horizontal position to deposit the lens mold sections onto the second assembly.

2. Apparatus according to claim 1, wherein the hand includes:
a base;
a bellows to receive and releasably hold the lens mold sections and mounted on the base for movement therewith.

3. Apparatus according to claim 2, wherein:
the bellows forms an interior; and
the first assembly further includes means connected to the bellows to develop a low pressure in the interior thereof to help hold the lens mold sections on the bellows.

4. Apparatus according to claim 1, wherein the connecting means includes:
a first arm mounted on the support frame for sliding movement therealong; and
a second arm connected to the hand and pivotally connected to the first arm.

5. Apparatus according to claim 4 wherein:
the hand includes a base having a generally flat, planar shape; and
the second arm supports the base of the hand for pivotal movement between the substantially vertical orientation and the substantially horizontal orientation.

6. Apparatus according to claim 1, wherein:
the support subassembly further includes a support member;
the support frame is slidably mounted on the support member; and
the support subassembly further includes means to slide the support frame along the support member.

7. Apparatus according to claim 1, wherein the second assembly includes:
a support frame;
a platform to receive the lens mold sections from the first assembly, and supported by the support frame for movement between the first and second locations; and
moving means for moving the platform between said first and second locations.

8. Apparatus according to claim 7, wherein the platform includes:
a lower section mounted on the support frame;
an upper section mounted on the lower section and including a receptacle to receive and to carry the lens mold sections; and
means for reciprocating the upper section upward and downward relative to the lower section.

9. Apparatus according to claim 7, wherein:
the support frame includes a top portion forming first and second channels extending along the support frame; and
the platform includes
  i) a base section supported for sliding movement along the top portion of the support frame, and
  ii) first and second legs connected to the base section and extending downward therefrom and into the first and second channels, respectively, to guide movement of the platform along the support frame.

10. Apparatus according to claim 9, wherein:
the top portion of the support frame includes a central member laterally extending partially over both of the first and second channels; and
the legs of the platform extend beneath lateral portions of said central member to help hold the platform on the support frame.

11. Apparatus according to claim 7, wherein the moving means includes:
a ball screw longitudinally extending along and rotatably supported by the support frame; and
a motor connected to the ball screw to rotate the ball screw.

12. Apparatus according to claim 11, wherein:
the platform engages the ball screw; and rotation of the ball screw moves the platform along the support frame.

13. Apparatus according to claim 1, wherein the third assembly includes:
a transport subassembly to receive the lens mold sections from the second assembly, to releasably hold the lens mold sections, and to carry the lens mold sections to the third location; and
a support column supporting the transport subassembly for movement between the second and third locations.

14. Apparatus according to claim 13, wherein the transport subassembly includes:
a first arm supported by the support column for pivotal movement;
a second arm supported by the first arm for pivotal movement;
a third arm supported by the second arm and extending downward therefrom;
means to pivot the first and second arms; and
a hand for receiving and releasably holding the lens mold sections and connected to the third arm for movement therewith.

15. Apparatus according to claim 14, wherein:
the first arm includes first and second ends;
the second arm includes first and second ends;
the first end of the first arm is mounted directly on the support column;
the second end of the first arm is pivotally connected to the first end of the second arm; and
the third arm is connected to and extends downward from the second end of the second arm.

16. Apparatus according to claim 15, wherein:
the first arm is supported by the support column for pivotal movement about a first axis;
the second arm is connected to the first arm for pivotal movement about a second axis, parallel to and spaced from the first axis; and
the third arm extends downward from the second arm along a third axis, parallel to and spaced from both the first and second axes.

17. Apparatus according to claim 14, wherein the third arm includes reciprocating means connected to the hand to move the hand upward and downward.

18. Apparatus according to claim 14, wherein the hand includes:
a base; and
a bellows to receive and releasably hold the lens mold sections, and mounted on the base for movement therewith.

19. Apparatus according to claim 18, wherein:
the bellows forms an interior; and
the third assembly further includes means connected to the bellows to develop a low pressure in the interior thereof to help hold the lens mold sections on the bellows.

20. Apparatus according to claim 1, further comprising a fourth assembly for receiving the lens mold sections from the third assembly for transporting the lens mold sections to a fourth location.

21. Apparatus according to claim 20, wherein the fourth assembly includes means to invert the lens mold sections.

22. Apparatus according to claim 21, wherein the means to invert the lens mold sections includes:

a hand to receive the lens mold sections from the third assembly and releasably hold the lens mold sections; and a support subassembly, including
i) a support member,
ii) an arm rigidly connected to the hand and supported by the support means for pivotal movement, and
iii) means to pivot the arm.

23. Apparatus according to claim 22, wherein the fourth assembly further includes means to move the hand upwards and downwards.

24. Apparatus according to claim 20, wherein the fourth assembly includes:

a hand to receive the lens mold sections from the third assembly and to releasably hold the lens mold sections; and a support subassembly connected to the hand to pivot the hand and to reciprocate the hand upwards and downwards.

25. Apparatus according to claim 24, wherein:

the support subassembly includes
i) a support frame,
ii) a first support member supported on the support frame for upward and downward movement,
iii) means mounted on the support frame and connected to the first support member to move the support member upwards and downwards,
iv) a second support member connected to the first support member for upward and downward movement therewith,
v) an arm connected to the second support member for upward and downward movement therewith, and supported by the second support member for pivotal movement, and
vi) means to pivot the arm; and the hand is connected to the arm for upward and downward movement therewith and for pivotal movement therewith.

* * * * *